United States Patent Office.

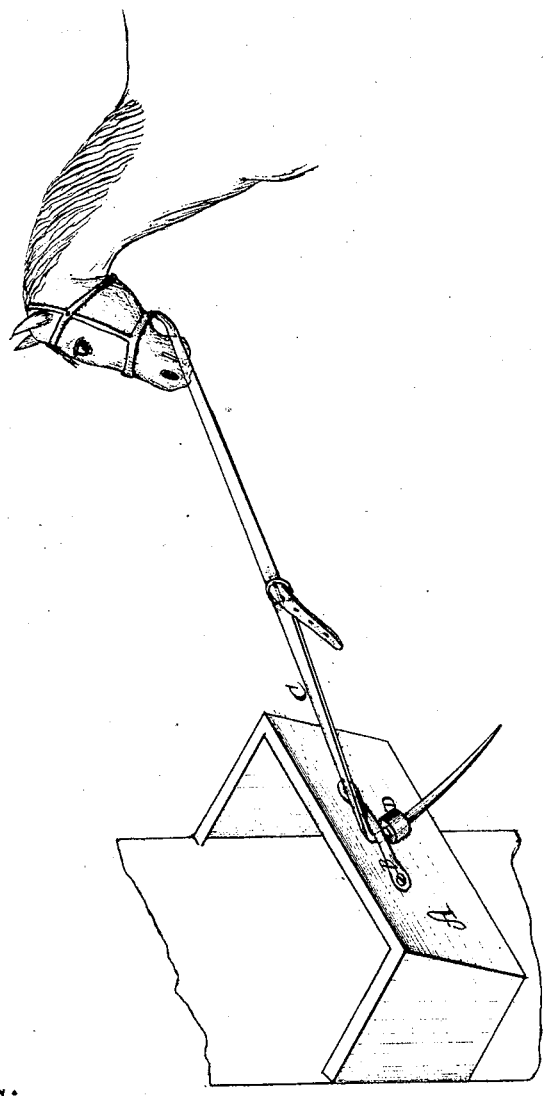

E. D. CRAMER, OF HACKETTSTOWN, NEW JERSEY.

Letters Patent No. 95,883, dated October 19, 1869.

IMPROVED STABLE HORSE-TIE.

The Schedule referred to in these Letters Patent and making part of the same.

*To all whom it may concern:*

Be it known that I, E. D. CRAMER, of Hackettstown, in the county of Warren, and State of New Jersey, have invented a new and useful Improvement in Stable Horse-Tie; and I do hereby declare that the following is a full, clear, and exact description thereof, which will enable others skilled in the art to make and use the same, reference being had to the accompanying drawings, forming part of this specification.

This invention relates to a new and useful improvement in a device for hitching horses in stables, and in other places, and consists in the use of an elastic spring-block, or other spring or springs, through which the halter of the horse passes, by the elasticity or spring of which sufficient friction is produced for securing or holding the horse ordinarily, as will be hereinafter more fully described.

The accompanying drawing is a perspective view of the device as when in use.

A represents the front of the manger.

B is a curved metallic rod, which is made fast to the manger by bolts or screws, as seen in the drawing.

C is the fastening-strap or halter, which is attached to or connected with the headstall.

D is an elastic block or spring, made of rubber or some equivalent material, through which the end of the strap is passed. The strap is tapering, so that the further it is drawn through the block, the tighter it becomes, as the friction is thus increased.

The strap, before it is inserted in the block, is passed behind the curved rod B, so that, when the horse draws upon the strap, a short angle is made, while the block is drawn in contact with the rod, as seen.

For all ordinary purposes this fastening is sufficient, but should the horse become tangled or thrown by any means, or frightened by a fire, and should draw hard upon his halter, the halter will give through the block, and, being tapering, the friction will diminish until the horse is entirely loosened and set free.

The elastic block acts as a spring for holding the halter. I do not confine myself to this particular form of spring-block, but design to use any form of block or spring whereby sufficient friction may be produced for properly securing the horse, and whereby the horse may, by simply pulling, release himself.

Sufficient friction may be produced by a simple metallic or wooden spring in connection with the manger, or between two pieces of wood or metal attached to the manger, and acted upon by a spring or springs, the object being to secure the halter or fastening-strap, where it shall be held solely by friction produced by a spring or springs, without knot, buckle, or loop.

Having thus described my invention,

I claim as new, and desire to secure by Letters Patent—

An improved stable horse-tie, formed by the combination of staple B, strap C, and elastic block D, the said parts operating together, substantially as shown and described.

E. D. CRAMER.

Witnesses:
ALFRED PETTY,
M. L. NAUGHRIGHT.